United States Patent Office

3,186,849
Patented June 1, 1965

3,186,849
REMOVAL OF CONTAMINANTS FROM MILK
Joseph Silverman, Hicksville, N.Y., assignor to Radiation Applications, Inc., Long Island, N.Y., a corporation of New York
No Drawing. Filed Nov. 2, 1959, Ser. No. 850,069
6 Claims. (Cl. 99—60)

This invention relates to the removal of contaminants from milk. More particularly, the invention relates to the separation of radioactive material from milk.

The problem of preserving foods from radioactive contamination or of removing radioactive contaminants from foods is an ever increasing one and considerable effort is being expended at the present time to solve this problem. The problem of removal of radioactive materials from foods is nowhere more pressing than that of removing radioactive materials, particularly strontium-90 from milk. The criticality of this problem is pointed up by the fact that the current maximum permissible dosage of strontium-90 in milk is 80 micromicrocuries of strontium-90 per liter of milk. There are indications, however, that this level will in time be decreased to about 16 micromicrocuries of strontium-90 per liter of milk. Tests carried out over an extended period of time have indicated that the amount of strontium-90 now present in milk has ranged from 2.2 to 47.5 micromicrocuries. It can thus be seen that in some cases the reading exceed what may eventually be the maximum permissible level of strontium-90 in milk. In any event, the precise effect of strontium-90 on the human body is not yet known and it is desirable to restrict the intake of this material to an absolute minimum. This is particularly true in the case of infants where the consumption of milk is relatively large since it constitutes virtually their entire diet and consequently the rate of strontium absorption is high.

The removal of strontium-90 from milk, as indicated previously, has been the subject of much discussion and considerable research effort has been expended in an effort to solve this problem. Previous work by other investigators has concentrated on the use of ion-exchange resins to selectively remove the strontium from milk. Even in those instances, however, where strontium removal was accomplished, the use of resins may add harmful impurities such as fragments of the resin to the milk. Furthermore, ion-exchange resins are expensive and the cost of milk treatment becomes excessive.

It is, therefore, an object of this invention to provide a process for the selective removal of strontium-90 from milk.

It is another object of this invention to provide a relatively inexpensive process for the removal of strontium-90 from milk.

It is a further object of this invention to provide a process for the removal of strontium-90 from milk without the addition of harmful adulterants.

These and other objects of this invention will become apparent from the following detailed description.

According to this invention there is provided a process for removing strontium from milk which comprises contacting the milk with an edible, slightly soluble inorganic metallic salt selected from the group consisting of those salts which have the property of exchanging with strontium and salts which themselves dissolve in the milk upon heating and which upon cooling precipitate and carry the strontium down with them.

The compounds of this invention should only be slightly soluble in the milk at room temperatures so as not to change the chemical composition of the milk or to affect the commercial acceptability of the milk. If a compound having a high solubility is used, not all of the compound can easily be removed from the milk and the presence of the added compound changes the chemical consistency of the milk and might also change the taste, etc., thereby effecting the salability of the milk.

Particularly suitable compounds for carrying out the process of my invention are the salts of calcium and magnesium such as calcium phosphate, calcium carbonate, calcium lactate, calcium citrate and the corresponding magnesium salts. Calcium phosphate and calcium lactate are particularly desirable because they are generally present in milk in a saturated solution and thus may be used to remove the strontium-90 from the milk without introducing into the milk any additional impurities. Not all of the compounds work equally well however and I prefer to use calcium phosphate based on the overall considerations of amount of strontium-90 removal, rate of removal and cost.

The amount of the compound that is to be added to the milk will vary over a wide range and will depend, inter alia, on the particular compound used, the temperature at which it is added to the milk, and the subsequent processing of the milk, as will be described in greater detail hereinafter. Generally I have found that the weight of salt to be added to the milk should be such as to contain up to fifty grams of calcium. Preferably I prefer to add a weight of salt such that it contains between about 4 to 50 grams of the calcium. In the event that the salt of another bivalent metal is substituted for the calcium salt, the molar content of metal salt at the upper and lower concentration limits for this salt is the same as the molar concentration of calcium as specified above.

In carrying out the process of my invention, the particular conditions employed will depend upon the particular milk processing scheme being used. Therefore, the conditions of time, temperature, amount and nature of the inorganic salt added will depend upon such factors as the desired amount of strontium removal, the allowable temperature and the time that is available for performing the process. Generally the time will vary from between a few minutes to several hours or longer and the temperature will vary from about 5° C. to as high as about 80° C.

I have found that my invention may be applied at a number of stages in the processing of milk from the farm to the consumer. For example, the inorganic metal salt might be added to the milk immediately after the milk had been obtained from the cows. Generally, if the salt is added to the milk at this point in the process, a relatively long period of time must be allowed to obtain adequate removal of the strontium-90 because the milk will usually be stored at low temperatures until it is ready to be pasteurized. For example, I have found that if calcium phosphate is added at this point in the process, about 70% removal of strontium will be obtained after about 24 hours. The added calcium phosphate will be removed along with the strontium-90. The inorganic salt may be added to the milk at room temperature just prior to the pasteurization step and removed after pasteurization together with the strontium-90. If the inorganic salt is added at this point in the process, the solubility of the inorganic salt is increased and the rate of reaction will also be considerably increased, and consequently the strontium-90 will be removed from the milk relatively rapidly. For example, I have found that if calcium phosphate is added at this point in the process, about 88% of the strontium may be removed when the milk is heated at 60° C. for about 30 minutes. Following heating, the milk is cooled to precipitate the additionally dissolved inorganic salt causing precipitation of the strontium-90 along with the inorganic salt. The precipitated inorganic salt and strontium-90 can be removed from the milk by such conventional techniques as filtration and centrifugation.

Alternatively, the strontium-90 may be removed from the milk by passing the milk containing the contaminating material through a bed of the inorganic salt which has the property of exchanging with the strontium-90. The amount of strontium-90 removed will depend upon such factors as the particular inorganic salt used as the bed, the temperature of the milk being passed through the bed and the speed with which the milk is passed through the bed. The milk may be pasteurized either before or after being passed through the bed but I prefer to pasteurize the milk after strontium-90 has been removed from the milk. As a further step in the purification process, the milk may be subjected to filtration or centrifugation to ensure that no particles of the bed are in the milk when it is sold to the consumer.

For a more detailed description of the invention, reference should now be had to the following examples. Obviously, many modifications will be apparent to those skilled in the art and applicant intends only to be bound by the spirit and scope of the appended claims.

*Example 1*

A liter of milk was mixed with 40 grams of calcium phosphate and maintained at a temperature of 60° C. in a container equipped to agitate the mixture gently. Samples of the mixture were withdrawn periodically and the added calcium phosphate removed from the milk by centrifugation. The milk was then analyzed for strontium with results shown in the following table.

| Time after mixing, minutes: | Percent strontium removal |
|---|---|
| 2 | 39.1 |
| 5 | 46.3 |
| 12 | 52.1 |
| 15 | 54.5 |
| 30 | 60.4 |
| 63 | 69.1 |
| 90 | 71.4 |
| 120 | 72.8 |
| 150 | 75.2 |

*Example 2*

One liter of milk was mixed with 80 grams of calcium phosphate at 60° C. and the same procedure used in Example 1 was followed.

| Time after mixing, minutes: | Percent strontium removal |
|---|---|
| 15 | 82.2 |
| 30 | 87.7 |
| 60 | 91.0 |
| 90 | 93.4 |
| 120 | 93.0 |
| 150 | 95.0 |

*Example 3*

A liter of milk was mixed with 80 grams of calcium carbonate at 8° C. following the same procedure set forth in Example 1. After 24 hours, 35% removal of the strontium-90 was obtained.

*Example 4*

Milk was passed through a calcium phosphate bed, 6.2 centimeters in diameter and 8.7 centimeters high, at a rate of 2 cubic centimeters per minute. 59% of the strontium-90 originally present in the milk was removed.

*Example 5*

A liter of milk was mixed with 80 grams of calcium phosphate at 5° C. in accordance with the procedure set forth in Example I above. After being in contact with the milk for 24 hours, 70% removal of the strontium-90 was obtained.

While there has been shown what is considered to be a preferred embodiment of the invention, it will be manifest that many changes and modifications may be made therein without departing from the essential spirit of the invention. It is intended, therefore, in the annexed claims to cover all such changes and modifications as fall within the true scope of the invention.

What is claimed is:

1. A process for the removal of radioactive strontium from milk which comprises passing said milk through a bed of an edible inorganic calcium salt selected from the group consisting of calcium carbonate and calcium phosphate, thereby removing said strontium from the milk.

2. A process for removing radioactive strontium from milk which comprises contacting said milk with an inorganic calcium salt selected from the group consisting of calcium carbonate and calcium phosphate, maintaining said milk in contact with said salt at a temperature ranging from the freezing point of milk to pasteurization temperatures and for a period of time sufficient to remove the desired amount of said strontium from said milk.

3. A process for removing radioactive strontium from milk which comprises adding to the milk a compound selected from the group consisting of calcium carbonate and calcium phosphate in an amount such that the weight of said added calcium salt contains the equivalent of about 4 to about 80 grams of calcium per liter of milk, heating said milk to a temperature not to exceed the pasteurization temperature of milk, then cooling said milk and removing the undissolved calcium salt together with the strontium from said milk.

4. A process according to claim 3 wherein said milk is heated to a temperature at least in the range of up to about 80° C. for a period of from about 2 minutes to about 60 minutes.

5. A process for the removal of radioactive strontium from milk which comprises adding to the milk a calcium salt selected from the group consisting of calcium phosphate and calcium carbonate in an amount such that the weight of said added calcium salt contains the equivalent of about 4 to about 80 grams of calcium per liter of milk, allowing said calcium salt to remain in contact with said milk for an extended period of time and then removing the undissolved calcium salt together with the strontium from the milk.

6. A process according to claim 5 wherein the calcium salt is in contact with said milk for an extended period of time up to about 48 hours.

References Cited by the Examiner

UNITED STATES PATENTS

| 2,766,204 | 10/56 | Lowe | 210—59 |
| 2,793,953 | 5/57 | Loo | 99—60 |
| 3,094,419 | 6/63 | Singer et al. | 99—54 |

OTHER REFERENCES

"Ion Exchange Resins," by Kunin, John Wiley & Sons, Inc., New York, 1950, pp. 22–25.

"Fundamentals of Dairy Science," by Associates of Lore A. Rogers, published by Chemical Catalog Co., Inc., New York, 1928, pp. 20–22.

Nesbitt et al.: "The Removal of Radioactive Strontium From Water by Phosphate Coagulation," U.S. A.E.C. Publication, NYO 4435, Feb. 15, 1952.

A. LOUIS MONACELL, *Primary Examiner.*

TOBIAS E. LEVOW, ABRAHAM H. WINKELSTEIN, *Examiners.*